US011934415B2

(12) United States Patent
Jain et al.

(10) Patent No.: US 11,934,415 B2
(45) Date of Patent: *Mar. 19, 2024

(54) COMPUTER-BASED SYSTEMS FOR DYNAMIC DATA DISCOVERY AND METHODS THEREOF

(71) Applicant: Capital One Services, LLC, McLean, VA (US)

(72) Inventors: Aman Jain, Millburn, NJ (US); Tanveer Afzal Faruquie, Scarsdale, NY (US); Christopher J. Johnson, Sante Fe, NM (US); Jihan Wei, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/834,716

(22) Filed: Jun. 7, 2022

(65) Prior Publication Data
US 2022/0300523 A1 Sep. 22, 2022

Related U.S. Application Data

(63) Continuation of application No. 16/838,844, filed on Apr. 2, 2020, now Pat. No. 11,360,987.

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/248* (2019.01); *G06F 16/288* (2019.01);
(Continued)

(58) Field of Classification Search
CPC ............ G06F 16/24578; G06F 16/288; G06F 16/248; G06F 16/9024; G06N 20/00;
(Continued)

(56) References Cited

U.S. PATENT DOCUMENTS 8,805,737 B1 8/2014 Chen et al.
2011/0238615 A1 9/2011 Sinha
(Continued)

OTHER PUBLICATIONS

International Search Report and Written Opinion from International Application No. PCTUS2021/025138 dated Jun. 9, 2021.

*Primary Examiner* — Kris E Mackes
*Assistant Examiner* — Lin Lin M Htay
(74) *Attorney, Agent, or Firm* — Greenberg Traurig, LLP

(57) ABSTRACT

In order to facilitate dynamic graphing of entity networks based on activity, systems and methods include a processor receiving entity-specific data records and a plurality of entity-related activity records for a plurality of entities, where each entity-specific activity record includes activity data regarding at least one activity associated with an entity. The processor generates graph nodes for an entity activity graph based on the plurality of entity-specific data records, where each graph node of the plurality of graph nodes represents the particular entity and then generating an activity data structure, including the graph nodes and edges between the graph nodes, where the edges represent characteristics of the activities between graph nodes based on the entity-related activity record.

20 Claims, 8 Drawing Sheets

(51) Int. Cl.

| | |
|---|---|
| *G06F 16/28* | (2019.01) |
| *G06F 16/901* | (2019.01) |
| *G06N 20/00* | (2019.01) |
| *G06Q 10/0635* | (2023.01) |
| *G06Q 30/018* | (2023.01) |
| *G06Q 30/0201* | (2023.01) |
| *G06Q 30/0282* | (2023.01) |

(52) U.S. Cl.
CPC ......... *G06F 16/9024* (2019.01); *G06N 20/00* (2019.01); *G06Q 10/0635* (2013.01); *G06Q 30/0185* (2013.01); *G06Q 30/0201* (2013.01); *G06Q 30/0282* (2013.01)

(58) Field of Classification Search
CPC ........... G06Q 10/0635; G06Q 30/0185; G06Q 30/0201; G06Q 30/0282
See application file for complete search history.

(56) References Cited

U.S. PATENT DOCUMENTS

| | | |
|---|---|---|
| 2013/0246342 A1 | 9/2013 | Faith et al. |
| 2014/0330956 A1 | 11/2014 | Telfer et al. |
| 2017/0053294 A1 | 2/2017 | Yang et al. |
| 2019/0130613 A1 | 5/2019 | Bhatt et al. |

US 11,934,415 B2

COMPUTER-BASED SYSTEMS FOR DYNAMIC DATA DISCOVERY AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems, devices, components and objects configured for automated entity and activity resolution for dynamic network graph generation and novel applications thereof.

BACKGROUND OF TECHNOLOGY

Typically, analysis of entity behaviors, such as business transactions, focuses on single business record sources where data related to a single business is derived from that single business. Any decision making or subsequent analysis relies on inference from that single source of records. Thus, to evaluate the relationship of a given entity with other entities relies on individually evaluating each single entity. Where one entity in the group does not provide records, a full evaluation of the group is difficult. Moreover, such single-entity oriented evaluation is static and often out-of-date. Accordingly, systems and methods for determining holistic and dynamic representations of groups of entities and their respective behaviors and activities is unknown in the art.

SUMMARY OF DESCRIBED SUBJECT MATTER

In some embodiments, the present disclosure provides an exemplary technically improved computer-based method that includes the following steps of receiving, by at least one processor, a plurality of entity-specific data records for a plurality of entities, where each entity-specific data record of the plurality of entity-specific data records is associated with a particular entity of the plurality of entities; receiving, by the at least one processor, a plurality of entity-related activity records for the plurality of entities, where each entity-specific activity record of the plurality of entity-related activity record includes activity data regarding at least one activity associated with at least one entity; generating, by the at least one processor, a plurality of graph nodes for an entity activity graph based at least in part on the plurality of entity-specific data records, where each graph node of the plurality of graph nodes represents the particular entity of the plurality of entities; generating, by the at least one processor, an activity data structure, including: i) the plurality of graph nodes and ii) at least one respective dynamic edge directed from a respective first node to a respective second node of the plurality of graph nodes based at least in part on at least one respective activity represented in the plurality of entity-related activity records, where the at least one respective dynamic edge represents at least one respective dynamic characteristic of the at least one respective activity between the plurality of graph nodes based at least in part on a dynamic updating of at least one entity-related activity record; determining, by the at least one processor, a set of entities having queried characteristics in response to a graph query of the activity data structure for the queried characteristics from at least one user computing device associated with at least one user; and causing to display, by the at least one processor, an indicated of the set of entities on a display of the at least one computing device.

In some embodiments, the present disclosure provides an exemplary technically improved computer-based method that includes the following steps of receiving, by at least one processor, a plurality of entity-specific data records for a plurality of entities, where each entity-specific data record of the plurality of entity-specific data records is associated with a particular entity of the plurality of entities; receiving, by the at least one processor, a plurality of entity-related activity records for the plurality of entities, where each entity-specific activity record of the plurality of entity-related activity record includes activity data regarding at least one activity associated with at least one entity; generating, by the at least one processor, a plurality of graph nodes for an entity activity graph based at least in part on the plurality of entity-specific data records, where each graph node of the plurality of graph nodes represents the particular entity of the plurality of entities; generating, by the at least one processor, an activity data structure, including: i) the plurality of graph nodes and ii) at least one respective dynamic edge directed from a respective first node to a respective second node of the plurality of graph nodes based at least in part on at least one respective activity represented in the plurality of entity-related activity records, where the at least one respective dynamic edge represents at least one respective dynamic characteristic of the at least one respective activity between the plurality of graph nodes based at least in part on a dynamic updating of at least one entity-related activity record; and generating, by the at least one processor, an entity rank representing a list of the plurality of entities ranked according a ranking algorithm based on each activity score quantifying the activity between the two or more graph nodes of the entity activity graph; and causing to display, by the at least one processor, the entity rank on a display of at least one computing device associated with at least one user.

In some embodiments, the present disclosure provides an exemplary technically improved computer-based system that includes the following components of at least one processor configured to access instructions stored in a non-transitory computer readable medium. The instructions cause the at least one processor to perform steps to: receive a plurality of entity-specific data records for a plurality of entities, where each entity-specific data record of the plurality of entity-specific data records is associated with a particular entity of the plurality of entities; receive a plurality of entity-related activity records for the plurality of entities, where each entity-specific activity record of the plurality of entity-related activity record includes activity data regarding at least one activity associated with at least one entity; generate a plurality of graph nodes for an entity activity graph based at least in part on the plurality of entity-specific data records, where each graph node of the plurality of graph nodes represents the particular entity of the plurality of entities; generate an activity data structure, including: i) the plurality of graph nodes and ii) at least one respective dynamic edge directed from a respective first node to a respective second node of the plurality of graph nodes based at least in part on at least one respective activity represented in the plurality of entity-related activity records, where the at least one respective dynamic edge represents at least one respective dynamic characteristic of the at least one respective activity between the plurality of graph nodes based at least in part on a dynamic updating of at least one entity-related activity record; and determine a set of entities having queried characteristics in response to a graph query of the activity data structure for the queried characteristics from at least one user computing device associated with at least one user; and cause to display an indicated of the set of entities on a display of the at least one computing device.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

FIGS. 1 through 8 illustrate systems and methods of generating and using a dynamic data structure for recording and representing relationships between entities from records retrieved from various sources. The following embodiments provide technical solutions and technical improvements that overcome technical problems, drawbacks and/or deficiencies in the technical fields involving entity understanding and modeling that relies on static, out-of-date and individual data records, often having incompatible formats, duplicate records and incomplete information regarding a relationship between multiple entities. As explained in more detail, below, technical solutions and technical improvements herein include aspects of improved data ingestion and resolution to retrieve and compile data records from various resources and aggregate activities amongst entities to generate a dynamic and holistic network model of entities. Based on such technical features, further technical benefits become available to users and operators of these systems and methods. Moreover, various practical applications of the disclosed technology are also described, which provide further practical benefits to users and operators that are also new and useful improvements in the art. For example, more complete and comprehensive analysis of risk, business targeting, entity influences, market breadth, referrals, and other applications are facilitated using the dynamic and holistic network model.

Misidentification of data assets is a technical problem that can originate from incorrect or incomplete information stored in, for example, large databases. Misidentification of data assets can also originate from the inability of data systems to identify relationships between data records that may be related. In general, misidentification of data assets may contribute to the technical problem of entity matching, i.e., the task of identifying data records which refer to or are associated with the same person or non-person entity.

As explained in more detail below, the technical solutions disclosed herein include aspects of computational techniques to identify relationships between data records, increase data coverage utilized during data identification processes by analyzing activity-related and entity-related values, and reduce data misidentifications. The technical solutions disclosed herein also include systems and methods that capture data relationships across data records through activities recorded therein by analyzing data records collected from one entity to identify an activity and associated additional entities to link the various entities according to activity. The technical solutions described herein are also agnostic to data schema differences, number of attributes, and can compare datasets where multiple attributes hold relationship information.

Figure 1:
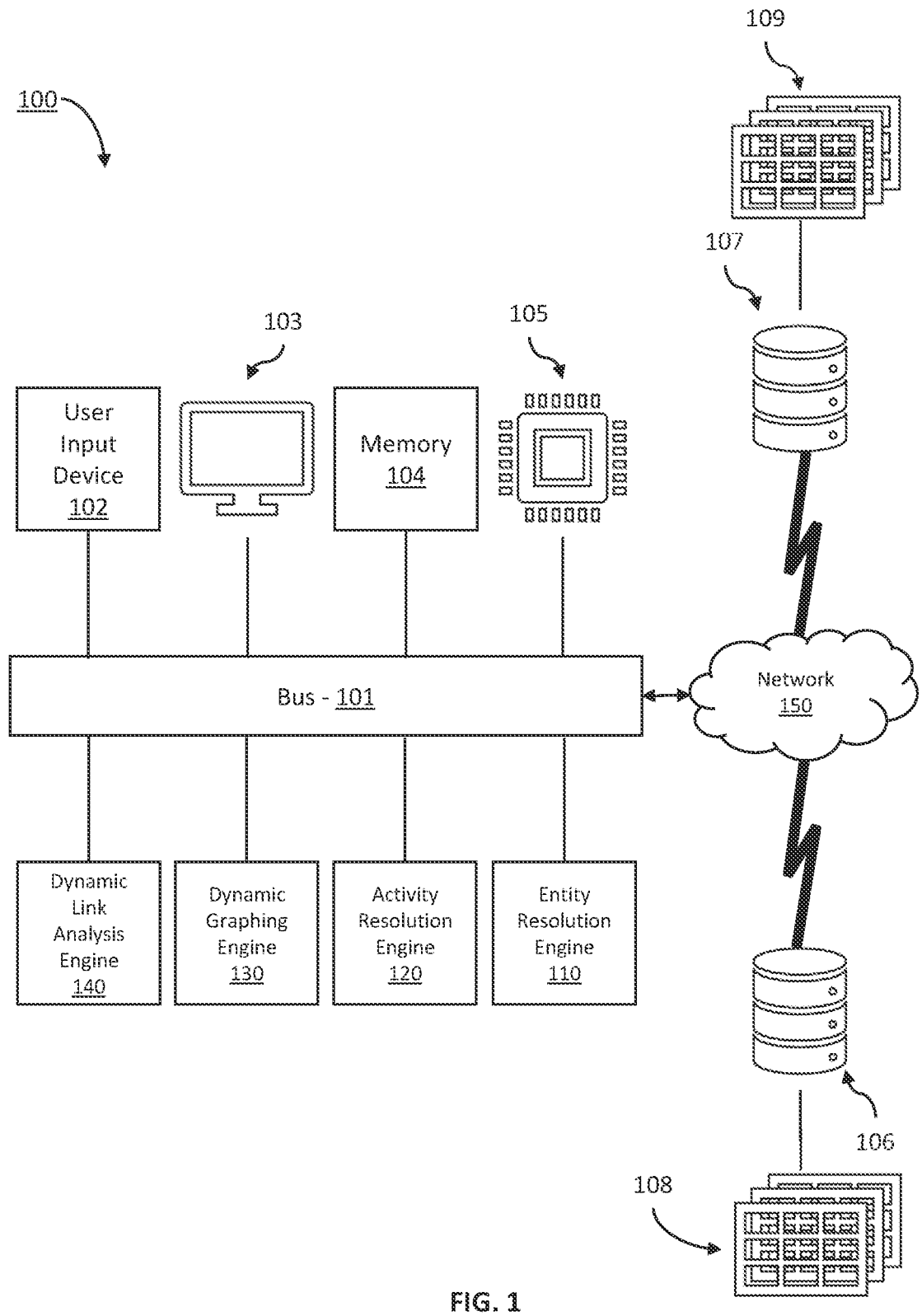
FIGS. 1-8 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of another illustrative computer-based system for generating a dynamic entity relationship graph in accordance with one or more embodiments of the present disclosure.

In some embodiments, an illustrative dynamic graphing system 100 includes a computing system having multiple components interconnect through, e.g., a communication bus 101. In some embodiments, the communication bus 101 may be a physical interface for interconnecting the various components, however in some embodiments, the communication bus 101 may be a network interface, router, switch, or other communication interface. In some embodiments, the communication bus 101 is in communication with a network 150 for receiving and transmitting data to remote devices and system, such as, e.g., the Internet, an intranet, a wired or wireless local network, or other network, via, e.g., a suitable network interface, including, e.g., a wired or wireless transmitter, receiver or transceiver.

In some embodiments, the dynamic graphing system 100 may receive, via, the network 150 sets of first records 108 and sets of second records 109. Various components of the dynamic graphing system 100 may interoperate to match data items from each set of records and generate a dynamic entity relationship graph amongst entities record in, e.g., the first records 108 according to activities recorded in, e.g., the second records 109. In some embodiments, the evaluation and characterization may include determining a value for each record associated with an entity and aggregating the total value for each entity to generate an activity index to characterize relationships between each entity. In some embodiments, the dynamic relationship graph may then be formed of the entities according to the activity index between each entity.

In some embodiments, the dynamic graphing system 100 may include a processor 105, such as, e.g., a complex instruction set (CISC) processor such as an x86 compatible processor, or a reduced instruction set (RISC) processor such as an ARM, RISC-V or other instruction set compatible processor, or any other suitable processor including graphical processors, field programmable gate arrays (FPGA), neural processors, etc.

In some embodiments, the processor 105 may be configured to perform instructions provided via the bus 101 by, e.g., accessing data stored in a memory 104 via the communication bus 101. In some embodiments, the memory 104 may include a non-volatile storage device, such as, e.g., a magnetic disk hard drive, a solid-state drive, flash memory, or other non-volatile memory and combinations thereof, a volatile memory such as, e.g., random access memory (RAM) including dynamic RAM or static RAM, among other volatile memory devices and combinations thereof. In some embodiments, the memory 104 may store data resulting from processing operations, a cache or buffer of data to be used for processing operations, operation logs, error logs, security reports, among other data related to the operation of the dynamic graphing system 100.

In some embodiments, a user or administrator may interact with the dynamic graphing system 100 via a display 103 and a user input device 102. In some embodiments, the user input device 102 may include, e.g., a mouse, a keyboard, a touch panel of the display 103, motion tracking or detecting, a microphone, an imaging device such as a digital camera, among other input devices. Results and statuses related to the entity evaluation system 110 and operation thereof may be displayed to the user via the display 103.

In some embodiments, a first database 106 may communicate with the dynamic graphing system 100 via, e.g., the communication bus 101 to provide the first records 108. In some embodiments, the first records 108 may include records having data items associated with entities, such as, e.g., commercial entities, including merchants, industrial entities, firms and businesses, as well as individuals, governmental organizations, or other entities. For example, the entities may be consumers and the data items may include, e.g., consumer transactions with merchants selling, e.g., products, services, etc. In some embodiments, the data items may include activities or behaviors recorded in association with the entities. For example, the activities or behaviors can include, e.g., transaction information related to purchases made by the entity, such as, e.g., a consumer purchase from a merchant. In some embodiments, the first records 108 are collected from, e.g., a consumer transaction database forming the first database 106. In some embodiments, the consumer transaction database may include, e.g., a credit card account database recording credit card transactions as records of activity, or other bank account databases and financial account databases, and combinations thereof. Thus, in some embodiments, the first records 108 may include data items for each record, including, e.g., a date, a quantity of the transaction, and a merchant or other payee or payment destination associated with the transaction.

In some embodiments, a second database 107 may communicate with the dynamic graphing system 100 to provide second records 109 via, e.g., the communication bus 101. In some embodiments, the second records 109 may include entity records identifying entities, such as, e.g., commercial entities, including merchants, industrial entities, firms and businesses, as well as individuals, governmental organizations, or other entities that are the same or different from the first entities. In some embodiments, the second records 109 include records of data items identifying, e.g., each merchant in a geographic area, each merchant in a catalogue or database of business partners or business customers, or other database of merchants and associated records. In some embodiments, the data items may include, e.g., information related to an entity name or secondary name, address, a business owner, a geographic location (e.g., latitude and longitude), a zip code, telephone number, industry category or description (e.g., education, healthcare, food services, etc.), franchise indicator (e.g., a "1" to designate a franchise, or a "0" to designate not a franchise, or vice versa), among other information and combinations thereof. In some embodiments, the second records 109 are collected from, e.g., a consumer transaction database, web search results, an entity index, or other compilation of entity records into a database such as, e.g., the second database 107.

In some embodiments, the dynamic graphing system 100 may use the sets of the second records 109 where each set includes an independent compilation of entities. Because each set may have independently collected and recorded data records for each entity in a respective set, the various sets may have duplicate records, formatting discrepancies, various errors, among other inconsistencies. Thus, in some embodiments, the dynamic graphic system 100 may merge the records in sets of second records 109 into a merged set of all unique second records 109 in the second database 107. Accordingly, in some embodiments, a set of components communicate with the communication bus 101 to provide resources for, e.g., matching each record across the sets of second records 109, merging records associated with common entities.

In some embodiments, an entity resolution engine 110 receives the second records 109. In some embodiments, the entity resolution engine 110 may include, e.g., a memory having instructions stored thereon, as well as, e.g., a buffer to load data and instructions for processing, a communication interface, a controller, among other hardware. A combination of software or hardware may then be implemented by the entity resolution engine 110 in conjunction with the processor 105 or a processor dedicated to the entity resolution engine 110 to implement the instructions stored in the memory of the entity resolution engine 110.

In some embodiments, the entity resolution engine 110 may analyze each record in each set of the second records 109 to identify and merge records associated with common entities. For example, the entity resolution engine 110 may employ, e.g., pre-processing to normalize record formats and reduce errors and redundancies, blocking using logical rules, hashing, or both to identify potential or candidate matches of records between sets, feature extraction to characterize each potential or candidate match, machine learning or logical rules based processing to identify matches, heuristic searches to match records, among other techniques and combinations thereof. In some embodiments, the entity resolution engine 110 may produce a table having a column for each unique entity identified in one or more of the sets of second records 109. In some embodiments, the rows of the table may include data from each record of the second records 109 associated with the unique entity listed in the column. The table may include one or more additional columns to list data items from each record of the second records 109 associated with the entity in row. In some embodiments, the entities are represented in rows with associated data specified in columns. In some embodiments, rather than a table, each entity forms a record including a file containing the data from each of the records matching the entity. Other structures and links between records are also contemplated.

In some embodiments, the machine learning techniques may be chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, each entity record structure representing data from all second records 109 matching a given entity may be stored in a merged record database, e.g., the second database 107 as described above. In some embodiments, each record in the sets of second records 109 from a given entity may be merged into an associated existing record or new record in the second database 107. The second database 107 is thereby updated with entity-related data from the second records 109 in an efficient manner with fewer processing instructions, shorter runtime, and reduced redundancy in records.

In some embodiments, the dynamic graphing system 100 may employ an activity resolution engine 120 to also use the sets of first records 108 to evaluate relationships and activities amongst each entity identified in the merged second records 109. Accordingly, in some embodiments, a set of components communicate with the communication bus 101 to provide resources for, e.g., matching first records 108 with second records 109, establishing activities attributable to each entity, and generating an index to evaluate each entity. For example, the activity resolution engine 120 may employ, e.g., pre-processing to normalize record formats and reduce errors and redundancies, blocking using logical rules, hashing or both to identify potential or candidate matches of records between sets, feature extraction to characterize each potential or candidate match, machine learning or logical rules based processing to identify matches, heuristic searches to match records, among other techniques and combinations thereof. Using, e.g., entity names, locations or addresses, phone numbers, or other data, and combinations thereof, the activity resolution engine 120 may assign each activity recorded in each set of first records 108 to duplicate activity records across the sets of the first records 108.

In some embodiments, similar to merging the sets of second records 109, the activity resolution engine 120 may first resolve the activity records across the sets of the first records 108, e.g., using the pre-processing, blocking, hashing, feature extraction, machine learning matching, heuristic matching, rules-based matching, among other techniques and combinations thereof. The activity resolution engine 120 may, thus, merge each duplicate activity record in the sets of first records 108 according to, e.g., entity name, entity location, entity phone number, activity name, activity location, activity identifier, activity quantity, among other attributes and combinations thereof. The matching activity records may then be merged into merged first records 108 including record entries for each unique activity across the first records 108. In some embodiments, each record in the sets of first records 108 from a given activity may be merged into an associated existing record or new record in the first database 106. The first database 106 is thereby updated with activity-related data from the first records 108 in an efficient manner with fewer processing instructions, shorter runtime, and reduced redundancy in records.

In some embodiments, a second resolving stage may then be employed by the activity resolution engine 220 to match each merged first record 108 to associated entities in the merged second records 109. Similar to the matching or resolution steps described above to merge first records 108 and to merge second records 109, the activity resolution engine 220 may utilize e.g., pre-processing to normalize record formats and reduce errors and redundancies, blocking using logical rules, hashing, or both to identify potential or candidate matches of records between sets, feature extraction to characterize each potential or candidate match, machine learning or logical rules based processing to identify matches, heuristic searches to match records, among other techniques and combinations thereof. Using, e.g., entity names, locations or addresses, phone numbers, or other data, and combinations thereof, the activity resolution engine 120 may assign each activity recorded in each set of first records 108 to associated entity records of the merged second records 109.

In some embodiments, upon identifying first records 108 matched to the second records 109, each activity of the first records 108 may be added to the associated entity records of the merged second records 109. For example, the activity resolution engine 120 may utilize one or more of the resolution techniques described above to match activities to each entity involved in the activity. For example, an activity can include a credit card transaction. Thus, the activity, and the associated activity record, may specify a payer, a payee, an amount transacted, an item or service purchased, a date, a location, among other activity details. Thus, the activity resolution engine 120 may match transactions between the entity associated with the payer and the entity associated with the payee, and link the transaction to each entity. In some embodiments, the first records 108 may be linked to associated entities of the second records 109 according to, e.g., entity names identified in the first records 108. Thus, each first record 108 may be represented as a file or table entry specifying each entity, as well as, e.g., a date, a year, an associated quantity, among other attributes.

In some embodiments, the entity resolution engine 110 and the activity resolution engine 120 are configured to represent associated entities according to a common format, e.g., using the matching of first records 108 to second records 109, as described above. Thus, an entity involved in a first record 108 has an entity name represented in the same way as that entity would be represented in an entity record of the second records 109. Thus, in some embodiments, a dynamic graphing engine 130 may generate an entity graph using the merged first records 108 as links between the merged second records 109. Accordingly, the dynamic graphing engine 130 may convert the merged second records 109 into nodes such that each entity forms a node in the entity graph. The dynamic graphing engine 130 uses the activities represented by the merged first record 108 to form links between the nodes, thus producing the graph representing activity relationships between each entity.

In some embodiments, the dynamic graphing system 100 may access the sets of first records 108 and the sets of second records 109 periodically to retrieve new records. For example, the dynamic graphing system 100 may retrieve the new records, e.g., once a day, once per week, once per two weeks, once per month, or other suitable period to identify and retrieve a batch of new records using, e.g., suitable application programming interfaces (APIs) for batch retrieval from the first database 106 and second database 107 across the network 150. In some embodiments, the dynamic graphing system 100 may receive a stream of new records, e.g., via APIs, a publish-subscribe message retrieval protocol, a pull request via the APIs, or other mechanism. Upon retrieving the new records, the dynamic graphing system 100 may update the entity graph by instantiating the entity resolution engine 110, activity resolution engine 120 and dynamic graphing engine 130 to update the nodes and links of the entity graph based on the new records. As a result, the entity graph is regularly updated to maintain current representations of behavioral relationships between entities.

In some embodiments, the entity graph may be provided to a dynamic link analysis engine 140 to utilize the up-to-date entity graph for activity analysis of each entity in a holistic and dynamic way that reflects activities amongst entities, even where particular entities may not provide information related to the activities. For example, the dynamic graphing engine 130 may link a first entity to an unknown or new entity using the activity information from the first entity alone without any prior or additional knowledge of the unknown or new entity. Thus, even where the first records 108 or second records 109 reflect information gathered from only a subset of entities, relationships to entities outside of the subset may still be inferred and graphed because of the entities identified in the activity records of the first records 108. Thus, even entities outside of the subset may be graphed as nodes despite those entities not originating any of the records. Moreover, the entity graph forms a representation of aggregate relationship between any one or more entities because the activities between the entities are all stored and represented as links between the entities, which may be manipulated and processed to represent aspects of the relationship between the entities. For example, transaction behaviors between two businesses may be represented according to purchases by one entity, sales by the one entity, aggregated sales and purchases (e.g., a spend index representing the gross or net transaction activity), aggregated sales, purchases or both of a certain monetary quantity, or other filtering of the links between any entities. Thus, the relationship between entities may be dynamically represented.

In some embodiments, a dynamic link analysis engine 140 may produce the dynamic representations and filtering of the links between entities. In some embodiments, the dynamic link analysis engine 140 may include, e.g., a memory having instructions stored thereon, as well as, e.g., a buffer to load data and instructions for processing, a communication interface, a controller, among other hardware. A combination of software and/or hardware may then be implemented by the dynamic link analysis engine 140 in conjunction with the processor 105 or a processor dedicated to the dynamic link analysis engine 140 to implement the instructions stored in the memory of dynamic link analysis engine 140. For example, the first records 108 may include activity quantity fields that quantify activities (e.g., a number or activities, a monetary quantity associated with each activity such as transaction quantities, or other quantification) between entities. Thus, in some embodiments, the dynamic link analysis engine 140 may aggregate activities amongst each entity (e.g., between each entity pair).

For example, in some embodiments, the second records 109 include merchants, and the matching first records 108 include transactions associated with a merchant, including a dollar amount paid to or received from the matching merchant. In such a scenario, the dynamic link analysis engine 140 may sum the dollar amounts of all transactions associated with a merchant to determine an aggregate dollar amount associated with merchant activity. Thus, the dynamic link analysis engine 140 may determine an aggregate quantity associated with activities of each entity of the second records 109.

In some embodiments, the dynamic link analysis engine 140 utilizes the aggregate quantities to generate a quantity index or rank that represents an evaluation of the activity of each entity using, e.g., a gross activity quantity or PageRank algorithm, or other index generation technique. For example, each entity can be compared to other known entities with known activities and activity quantities to determine a ranking, a risk level, or other measure of health of activity quantities. For example, wherein the second records 109 include merchants, the quantity index or rank may represent a revenue or health of revenue for the merchant based on aggregate transaction quantities, by, e.g., comparison with other similar businesses.

In some embodiments, the dynamic link analysis engine 140 may be updated in a temporally dynamic fashion, e.g., daily, weekly, monthly or by another period based on, e.g., user selection via the user input device 102. Thus, the first and/or second records 108 and 109 may be updated with new records on a periodic basis or in real-time, and the dynamic graphing system 100 may match the records and aggregate activities as described above according to the selected period. In some embodiments, the quantity index or rank may be updated each period based on the total set of records, however in some embodiments, each period results in a new quantity index or rank representative of that period. In some embodiments, the new or updated quantity index or rank for each period may be logged and/or records in, e.g., the memory 104 for historical tracking of entity activities. Thus, trends and risks associated with each entity may be determined through time.

In some embodiments, the dynamic link analysis engine 140 may further employ the quantity index or rank to make recommendations concerning each entity. For example, in some embodiments, where the entities are merchants, the dynamic link analysis engine 140 may generate marketing recommendations for financial products in direct mailing marketing, such as, e.g., lines of credit, loans, mortgages, investment, etc. For example, the dynamic link analysis engine 140 may compare an entity's quantity index or rank with financial products to, e.g., target active businesses based on a threshold level of activity, identify product fit over time and/or relative to other businesses based on the amount of business conducted, and identify unsuitable businesses based on activity being below a threshold level according to the quantity index or rank. Thus, each respective second entity record may be categorized based on each respective associated quantity index or rank according to a set of predetermined quantity index or rank ranges based on multiple threshold levels of activity. The categorizations may then be used to match each respective second entity associated with each respective second entity record to a product of a plurality of products assigned to each set of predetermined quantity index or rank ranges.

Similarly, in some embodiments, the quantity index or rank can be used for improved field agent marketing and with new and existing customers. For example, in some embodiments, second entities can be ranked according to each respective quantity index or rank determined for each respective entity record. In some embodiments, this ranking is performed for all entity records to determine a highest ranked set of entities that may be appropriate customers for a given product or set of products or other business communication. However, in some embodiments, the ranking is performed for a set of second entities that are already customers of products, and thus are targeted entities for upgrades of products and services. The highest ranking targeted entities may be identified and selected for, e.g., product upgrades or other business communications. In some embodiments, the dynamic link analysis engine 140 may utilize graph-based queries to identify the targeted entities. Thus, the graph relations between each entity may be leveraged to formulate queries for particular graph relation attributes.

In some embodiments, underwriting can be facilitated using the quantity index or rank from the dynamic link analysis engine 140. For example, in some embodiments, a quantity index or rank of a customer from the second entity records may be approved or disapproved based on, e.g., a threshold quantity index or rank assigned to a product or service for which the customer is applying.

Similarly, in some embodiments, customer management recommendations may be made by the dynamic link analysis engine 140. For example, wherein the entities are merchants, the dynamic link analysis engine 140 may utilize a graph-based query, the quantity index or rank, or both, to, e.g., offer products and terms to existing customers, offer upgrade opportunities where aggregate activity has shown consistent increases, identify business segments for each merchant based on activity amounts to customize marketing strategies and increase engagement with the financial products, among other customer management recommendations. In some embodiments, the offers may be determined by categorizing each respective second entity record of a set of second entity records into a respective customer category based on each respective quantity index or rank associated with each respective second entity record of the set of second entity records. Each quantity index or rank range can be one of a set of predetermined quantity index or rank ranges that relate to a set of products identified as appropriate for that quantity index or rank. Using the categorizations, modifications to products associated with each entity may be suggested to the respective entity to better match a customer to a product as the customer's business grows or recedes.

In some embodiments, the dynamic link analysis engine 140 may identify risky or fraudulent behavior based on, e.g., graph relation attributes. For example, entities that have charged their own credit cards for purchases (self-swipe) or have relations with charged-off accounts may be flagged as risky or fraudulent. Other anomalous relations may be identified.

Figure 2:
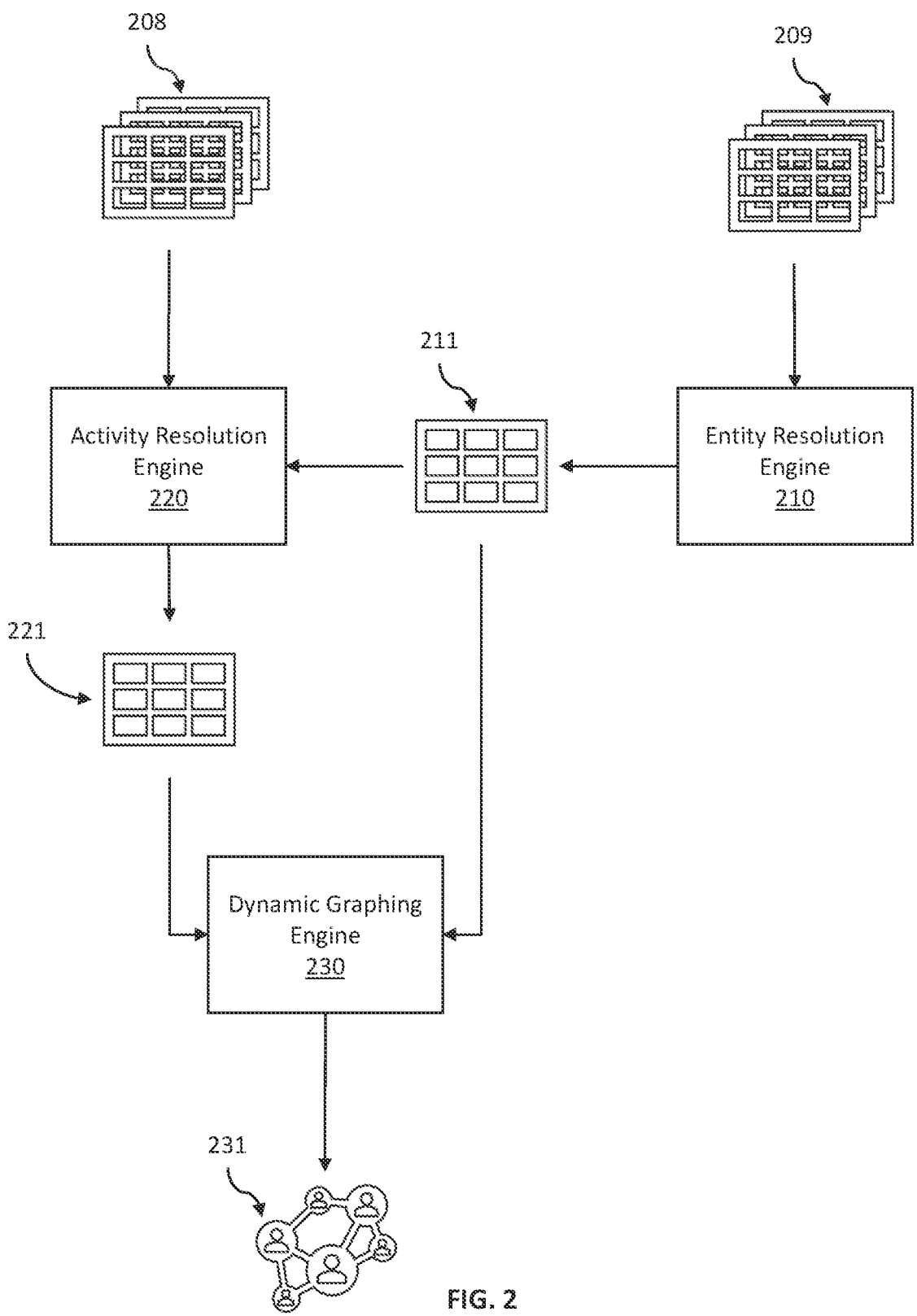

FIG. 2 is a block diagram of another exemplary computer-based system for generating a dynamic entity relationship graph in accordance with one or more embodiments of the present disclosure.

In some embodiments, the first records 208 and the second records 209 include raw data from the collection of records related to entities, entity activities, or both. As such, the data items from the first records 108 and the second records 209 may include, e.g., a variety of data formats, a variety of data types, unstructured data, duplicate data, among other data variances. Thus, to facilitate processing and using the data for consistent and accurate results, the data may be pre-processed to remove inconsistencies, anomalies and variances. Thus, in some embodiments, the entity resolution engine 210 may ingest, aggregate, and cleanse, among other pre-processing steps and combinations thereof, the data items from each set of the second records 209.

In some embodiments, the entity resolution engine 210 may compile the sets of the second records 209 into a single structure, such as, e.g., a single file, a single table, a single list, or other data container having consistent data item types. For example, each second record may be added to, e.g., a table with data items identified for each of, e.g., an entity name, an entity executive or owner, an entity address, an entity zip code, an entity geographic location (e.g., in latitude and longitude), an entity phone number, telephone number, industry category or description (e.g., education, healthcare, food services, etc.), franchise indicator (e.g., a "1" to designate a franchise, or a "0" to designate not a franchise, or vice versa), among other fields. The format of each field may be consistent across all records after pre-processing such that each record has a predictable representation of the data recorded therein.

In some embodiments, the structures containing each of the pre-processed second records may be stored in, e.g., a database or a storage, such as, e.g., the memory 104 described above, or a local storage of the entity resolution engine 210.

In some embodiments, additionally, or alternatively, the entity resolution engine 210 may perform blocking on the second records 209. In some embodiments, the blocking may include matching the entities from the independent sources of each set of the second records 209 to merge duplicates in a less processor intensive and resource intensive manner. Thus, blocking is employed to perform an initial rough estimate of candidate entity matches between the second records 209. In some embodiments, to perform the initial estimate, the entity resolution engine 210 may utilize, e.g., a heuristic search, an algorithm based on rule-based matching, a Minhash algorithm, or other suitable blocking technique and combinations thereof. The blocking may then match similar records in the pre-processed second records 209. In some embodiments, the heuristic search may compare each second record to compare, e.g., an entity data item of a particular record to a second entity data item of another particular record, where the entity data item may represent an entity name or entity identifier. The blocking may therefore determine potential matches based on the similarity of the entity data items. Similarly, a rule-based algorithm may iteratively compare each potential pair of records. However, to reduce processing operations and permutations of record pairs, a hashing algorithm, such as, e.g., Minhash, may be employed to determine likely matches without a need to assess each potential pair individually. However, to reduce the possibility of missing a possible pair using hashing, hashing may be combined with one or both of the heuristic search and rule-based algorithm.

Other or additional data items of each of the second records 209 may be incorporated in the blocking to determine potential matches. As a result, candidate pairs of potentially matching records between the second records 209 may be linked using, e.g., a table of each unique entity with each potentially matching second record 209. Other formats of presenting the potential matches are also contemplated, such as, e.g., a table having a column with the row including the second record with a row of the potentially matching unique entities, a separate file for each unique entity including data from each potentially matching second record, a table having a column with a row for each unique entity with a sub-row of the row including each potentially matching second record, a table having a column with a row for each unique entity with a sub-row of the row including each potentially matching second record, among other possible formats of presenting the blocked second records 209. Herein, the term "block" or "blocked" or "blocking" refers to a block of records or data items associated with a given record to associate multiple potential matches of data of a first type with a particular data of a second type.

In some embodiments, the entity resolution engine 210 may generate or extract features representative of characteristics of each blocked pair of records. The features may, therefore, characterize quantitatively the data entity representing an entity identified within the respective records (e.g., a user, merchant, organization, or other entity). In some embodiments, the features quantify the characteristics such that similarities between records may be quantified based on the similarity of the features. In some embodiments, the features include semantic features, such as, e.g., names, industry descriptions or categorizations, among other semantic features. In some embodiments, the features may include quantitative features, such as, e.g., location measurements, phone numbers, addresses, among others.

In some embodiments, a table or other representation of features of potentially matching records may be generated to correlate pairs of second records 209 to quantify each entity represented therein. In some embodiments, the table may then be stored in, e.g., a database or a storage, such as, e.g., the memory 104, or the local storage of the entity resolution engine 210.

In some embodiments, the entity resolution engine 210 may utilize the feature vectors to resolve entity matches. For example, using the blocked second records described above, the entity resolution engine 210 may compare the feature vectors characterizing the pair of records in each blocked pair of second records 209.

In some embodiments, the entity resolution engine 210 may utilize a machine learning model to correlate each feature vector for each pair with a probability of a match. Thus, in some embodiments, the entity resolution engine 210 utilizes, e.g., a classifier to classify entities and matches based on a probability, or a regression model to generate a probability value. In some embodiments, the machine learning model may include, e.g., random forest, gradient boosted machines, neural networks including convolutional neural network (CNN), among others and combinations thereof. Indeed, in some embodiments, a gradient boosted machine of an ensemble of trees is utilized. In some embodiments, the classifier may be configured to classify a match where the probability of a match exceeds a probability of, e.g., 90%, 95%, 97%, 99% or other suitable probability based on the respective data entity feature vectors.

In some embodiments, the pairs of second records that have a match probability, e.g., greater than or equal to 0.5, 0.6, or other suitable threshold, may be identified as matching entity records, and thus duplicative of a given entity. In some embodiments, the entity resolution engine 210 may merge groups of matching entities by clustering them together using, e.g., clustering algorithms, such as graph algorithms including, e.g., connected components algorithms, to produce matching clusters based on the probability scores of matching entity records. In some embodiments, each matching cluster may then be merged as merged entity records 211 that removes redundant data in the records forming the cluster. Accordingly, the sets of second records 209 may be resolved as related to a common entity and be represented in, e.g., a table, list, or other entity resolution data structure to produce a set of merged entity records 211 having reduced duplication of entities represented therein compared to the sets of second records 209.

In some embodiments, an activity resolution engine 220 may perform a similar resolution process to resolve activity records of the sets of first records 208. Thus, the activity resolution engine 220 may receive the perform a pre-processing step to remove inconsistencies, anomalies and variances. Thus, in some embodiments, the activity resolution engine 220 may ingest, aggregate, and/or cleanse, among other pre-processing steps and combinations thereof, the data items from each of the first records 208. Thus, the first records 208 may be compiled into a single structure, such as, e.g., a single file, a single table, a single list, or other data container having consistent data item types. For example, each first source record may be added to, e.g., a table with data items identified for each of, e.g., a date, a first entity, a second entity, a quantity, among other fields. The format of each field may be consistent across all records after pre-processing such that each record has a predictable representation of the data recorded therein.

In some embodiments, the activity resolution engine 220 may perform blocking, as described above for the second records 209. In some embodiments, similar to above, the blocking of the pre-processed first records 208 produces an initial rough estimate of candidate activity records matches for the activities, estimating pairs of activities according to, e.g., entity name or identifier, date, location, quantity or other attribute and combination thereof. In some embodiments, the blocking may be performed according to the merged entity records 211 such that the activity records of the sets of first records 208 are matched to potentially matching merged entity records 211 according to, e.g., entity name or identifier, location, or other attribute. In some embodiments, a given activity record may be blocked with more than one merged entity record 211 because each activity may include more than one entity. Thus, potential matches may be identified for each activity include one or more entities in the merged entity records 211.

In some embodiments, similar to the entity resolution engine 210 as described above, the activity resolution engine 220 may generate features characterizing similarity between records of each potential matching pair of first records 208 or each potential matching pair of a first record with a merged entity record 211. In some embodiments, to facilitate matching records, the feature generation may generate or extract features representative of characteristics of each record pair. In some embodiments, the features quantify the characteristics such that similarities between records may be quantified based on the similarity of the features according to, e.g., semantic features, such as, e.g., names, descriptions, location descriptions, among other semantic features. In some embodiments, the features may include quantitative features, such as, e.g., dates, location measurements, phone numbers, among others.

In some embodiments, the activity resolution engine 220 may utilize the feature vectors of the potentially matching first records 208 to resolve activity matches. For example, using the blocked first records and merged entity records 211, the activity resolution engine 220 may, e.g., utilize a machine learning model to correlate the feature vectors with a probability of a match. Similar to the entity resolution engine 210, the activity resolution engine 220 may employ a machine learning model including, e.g., a classifier to classify entities and matches based on a probability.

In some embodiments, the activity resolution engine 220 may, therefore, identify each entity of the merged entity records 211 that is associated with each first record 208. In some embodiments, each first record 208 may be matched to multiple entities of the merged entity records 211. Thus, to remove redundancies, thus decreasing computational resources, duplicate activity records that are matched to different entities may be merged to associate the activity record to all matching entities in a single record. Thus, the activity resolution engine 220 generates a set of entity relationship records 221 that record activities amongst entities, thus representing the relationship between entities.

In some embodiments, a dynamic graphing engine 230 can ingest both the entity relationship records 221 representing activity amongst entities, and the merged entity records 211 representing each unique entity. Using the entity relationship records 221 and the merged entity records 211, the dynamic graphing engine 230 may generate an activity data structure representing a dynamic representation of the entities linked by relationships to other entities. In some embodiments, the activity data structure includes a dynamic entity relationship graph that graphs a model of entity activities relative to each entity in the merged entity records 211.

In some embodiments, the dynamic graphing engine 230 may generate the activity data structure by graphing the merged entity records 211 as nodes of the dynamic entity relationship graph 231. In some embodiments, each graph node represents a particular entity in the merged entity records 211, thus representing an entity record associated with the particular entity. As such, each node may represent entity-specific data contained in the associated merged entity record 211, including, e.g., entity name, entity identifier, entity location or address, entity phone number, among other entity-specific data.

In some embodiments, the dynamic graphing engine 230 may link the nodes together according to relationships between each node as characterized by activities between the entities. Thus, in some embodiments, the dynamic graphing engine 230 may generate edges representing each entity-specific activity record for each node according to the entity represented by the node. For example, a node representing the entity-specific data record for Entity A may be linked to a node for Entity B based on the entity-specific activity records common to both Entity A and Entity B. In some embodiments, the edge between the nodes may be representative of at least one characteristic of the associated entity relationship records 221 to indicate the entity-specific activity between the entities represented by the nodes. For example, the edges may be recorded in a table specifying the correspond nodes for each activity, the date or year of each activity, and the quantity (e.g., transaction amount) of each activity, as depicted in Table 1 below:

TABLE 1

| From (acct_id) | To (acct_id or dnb_id) | Year | Spend |
|---|---|---|---|
| acct_id1 | acct_id2 | 2017 | $ 1,000 |
| acct_id1 | dnb_id1 | 2017 | $ 6,000 |
| ... | ... | ... | ... |
| acct_id2 | acct_id2 | 2018 | $30,000 |

In some embodiments, the first entry of Table 1 represents entity-specific activity data for the entities acct_id1 and acct_id2, with the characteristics of the Year 2017 and the Spend quantity of $1,000. Other characteristics may be represented by the edge, as determined from the corresponding entity relationship record 221, such as, e.g., purchase amount, location, itemized spend and purchase, etc.

In some embodiments, the dynamic graphing engine 230 may leverage the edges to dynamically and automatically determine characteristics of each node in the dynamic entity relationship graph 231 to be stored as properties of the respective nodes. For example, each node may be modified to dynamically represent an up-to-date indication of, e.g., spend total per year (or other time interval), spend total or purchase volume overall ("Pvol"), revenue, revenue per year, self-swipe count, net or gross self-swipe amount, net or gross spend/revenue (TotalSpend), transaction counts, rank (PageRank), among other characteristics of the entity represented by the node, broken down by overall total or according to any interval such as, e.g., by year, by fiscal half, by fiscal quarter, by season, by calendar quart, by month, by week, etc. In some embodiments, the rank may include a PageRank according to a PageRank algorithm, or a rank according to any other characteristic relative to each other entity according a ranking algorithm. For example, the rank may be based on an activity score, such as, e.g., net or gross spend, net or gross revenue, or other metric quantifying the activity between the two or more graph nodes of the dynamic entity relationship graph 231.

An example of graph generation using the entity records 211 as nodes and entity relationship records 221 as using, e.g., Cypher code for generating the graph. Other programming languages are also contemplated, such as, e.g., Python, Java, C, C++, C#, Kotlin, Ruby, Swift, Go, or any other suitable programming language. In some embodiments, the dynamic entity relationship graph 231 is generated in a suitable graphing database, such as, e.g., Neo4j, however other graphing databases are contemplated, including, e.g., Amazon Neptune, OrientDB, Oracle Spatial and Graph, SAP HANA, AllegroGraph, AnzoGraph DB, ArangoDB, DataStax, InfiniteGraph, JanusGraph, MarkLogic, Microsoft SQL Server, OpenLink Virtuoso, RedisGraph, Sparksee, Sqrrl, Teradata Aster, among others.

Figure 4:
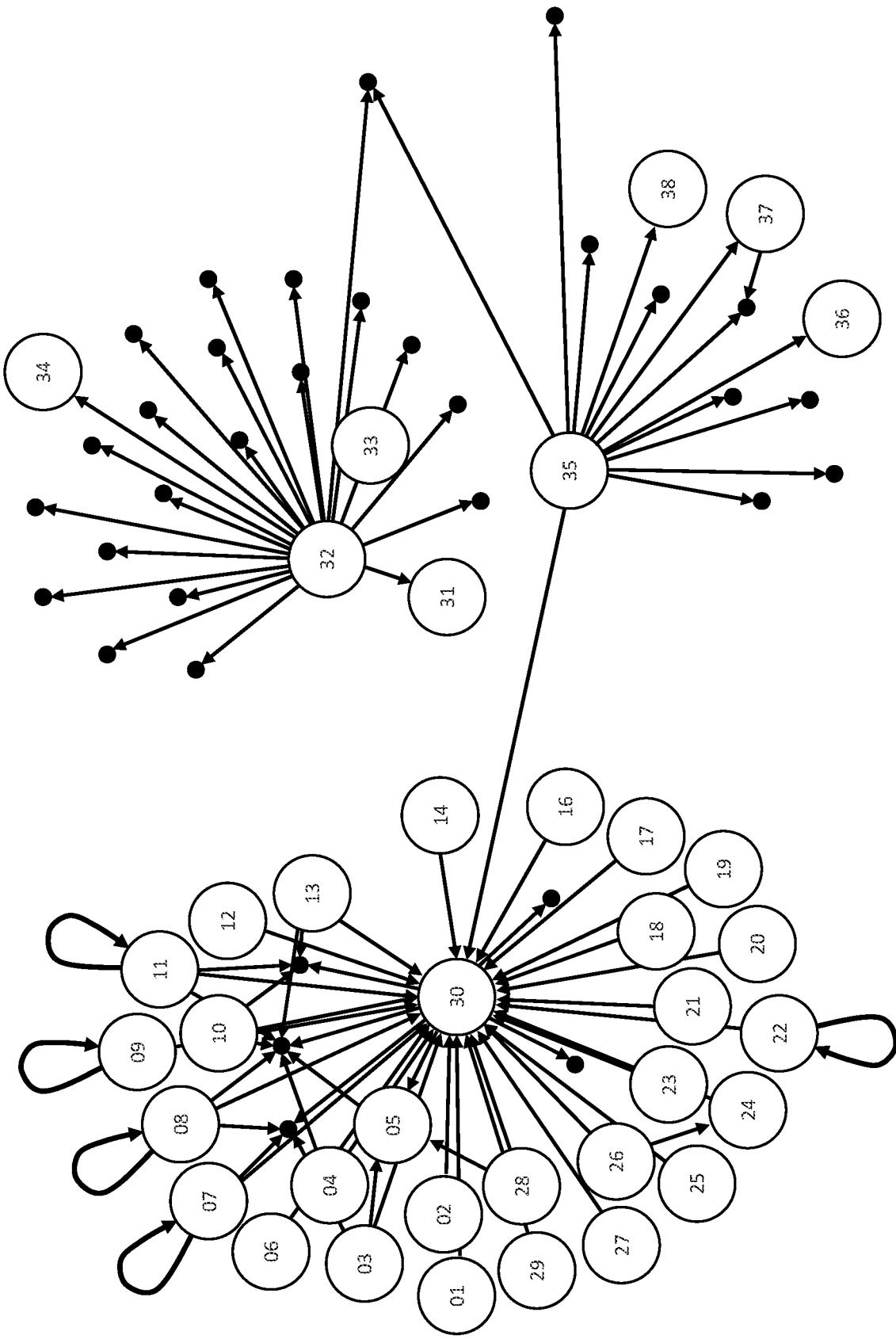

In some embodiments, the dynamic graphing engine 230 may produce the dynamic entity relationship graph 231 and provide the dynamic entity relationship graph 231 to a user computing device for display using a suitable graph visualization graphical user interface (GUI) (see, for example, FIG. 4). In some embodiments, the display can include an interactive visualization of the nodes and edges to dynamically view node properties, edge properties, and filter nodes according to edge and node properties. Thus, the dynamic entity relationship graph 231 provides a powerful graph visualization GUI for efficiently and accurately presenting relationships and behaviors amongst entities applicable for, e.g., marketing, including prospect targeting and recommendation of referrals, underwriting analyses, risky and fraudulent behavior identification, high-potential customer identification, among other applications.

Figure 3:
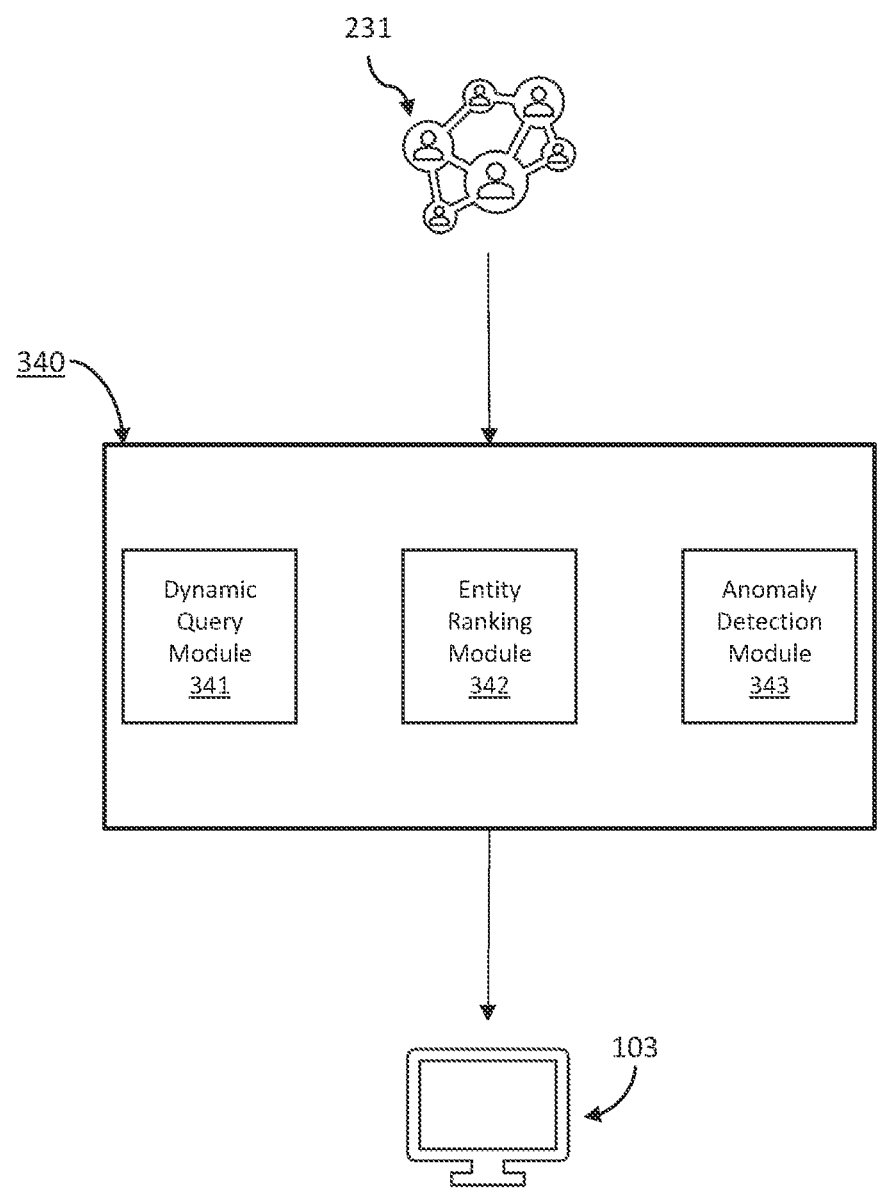

FIG. 3 is a block diagram of another exemplary computer-based system for performing dynamic link analysis of links in a dynamic entity relationship graph for dynamic analysis and assessment of relationships and activities between entities in accordance with one or more embodiments of the present disclosure.

In some embodiments, a dynamic link analysis engine 340 may analyze the dynamic entity relationship graph 231 to determine and identify trends and characteristics of relationships and behaviors amongst entities represented in the dynamic entity relationship graph 231. In some embodiments, the analyses of the dynamic link analysis engine 340 may be effectuated using, e.g., a dynamic query module 341 configured for querying the dynamic entity relationship graph 231, an entity ranking module 342 configured to rank the nodes according to a ranking algorithm, and an anomaly detection module 343 configured to identify behavioral or relationship anomalies amongst the nodes in the graph 231.

In some embodiments, the dynamic query module 341 may include, e.g., a suitable graph query mechanism, including a graph query language to search for and find nodes and edges according to specified properties. In some embodiments, the properties can include, e.g., scalar value types such as Boolean, string, number, integer, and floating-point numbers, temporal types like datetime, localdatetime, date, time, localtime, and duration, container types for maps and lists, graph types for node, relationship, and path, and a void type. For example, the dynamic query module 341 may employ, e.g., a Cypher query language, however other languages are contemplated, including, e.g., ArangoDB Query Language (AQL), GraphQL, Gremlin, SPARQL, among others.

In some embodiments, the dynamic link analysis engine 340 may include an entity ranking module 342 configured to rank the nodes, and thus the entities represented by those nodes, according to various attributes and characteristics. For example, where the entities are businesses and the edges are transactions, the entity ranking module 342 may utilize the total spend or total revenue, either historical total or for a given time period, to rank the nodes. As described above, the spend or revenue may be stored as a property of each node according to the aggregate amounts of transaction properties represented by the edges for each node. In some embodiments, the entity ranking module 342 may rank the entities according to, e.g., a suitable ranking algorithm such as, e.g., in-degree centrality (hereinafter referred to as TotalSpend) or PageRank. For example, TotalSpend may represent the number of edges directed towards a node. Where the edges represent monetary transactions, the in-degree edges represent incoming transactions, or revenue, associated with the entity represented by the node. In some embodiments, TotalSpend may be weighted, where each edge pointing towards a node is weighted, e.g., according to the amount of the transaction. PageRank, on the other hand, measures the importance of a node, assuming more important nodes are likely to receive more links from other nodes. PageRank may be represented according to equation 1 below:

$$\vec{p}_{i+1} = cA\vec{p}_i + \frac{1-c}{n}\vec{1}, \quad \text{(Eq. 1)}$$

where A is an adjacency matrix with column sum of 1, c is a damping factor, n is a number of nodes, and p represents the PageRank scores.

In some embodiments, both PageRank and TotalSpend may be used to identify entities that spend more, thus indicating increased eligibility for credit services, or entities that receive more spending, thus indicating a healthier business. For example, it has been found that the greater Total Spend is in a given year for an entity, the greater the purchase volume of that entity in the following year. Moreover, PageRank of each entities' TotalSpend for a given year is similarly predictive for purchase volume in the following year. Thus, an entity may be expected to have greater purchase volume in a given year where the entity had a high Total Spend in the prior year. Similarly, An entity may be expected to have greater purchase volume in a given year where the entity had a high PageRank in the prior year. For example, a high TotalSpend or high PageRank can include, e.g., about a top, e.g., $80^{th}$, $85^{th}$, $90^{th}$, $95^{th}$, etc., percentile of all entities.

Example 1—Node Attribute Projection

In some embodiments, the dynamic link analysis engine 340 may utilize the entity ranking module 342 to analyze the dynamic entity relationship graph 231 and identify entities associated with nodes having desired attributes. In particular, where the data for the dynamic entity relationship graph 231 is collected from a subset of originating entities represented by nodes in the dynamic entity relationship graph 231, attributes of other sets of nodes may be inferred based on edges extending from the nodes of the originating entities. For example, the records associated with some of the originating entities may include attributes indicating activities with nodes in the other sets of nodes, thus forming the other sets of nodes and edges linking them to the originating nodes. Nodes of the other sets of nodes may be identified and selected based on the attributes of those nodes as determined by an analysis of the edges connected to each of the nodes in the other sets of nodes.

For example, where the dynamic link analysis engine 340 is employed for marketing tools in business relationships, the dynamic link analysis engine 340 may be configured to identify nodes associated with entities having spending or revenue attributes based on the activities identified from the originating entities. Thus, in some embodiments, customer prospects, such as, e.g., "Super Spender" businesses that have a high degree of revenue relative to other businesses may be identified. For example, the entity ranking module 342 may remove outcoming spend and keep incoming spend. In some embodiments, to identify the Super Spenders, the entity ranking module 342 may remove outgoing Spend (e.g., money spent by a target entity) and analyze incoming Spend (e.g., money received by the target entity). PageRank may then be used to rank all businesses based on their respective incoming Spend and the top, e.g., $80^{th}$, $85^{th}$, $90^{th}$, $95^{th}$, etc., percentile of entities based on their incoming Spend, may be identified. The PageRank may be used as a way to rank high purchase volume companies based on the PageRank of those companies' incoming Spend, outgoing Spend, or TotalSpend. For example, table 5 below shows the relationship between PageRank and revenue or purchase volume (Pvol) for the 2018 year.

In some embodiments, other analysis may be used by the dynamic link analysis engine 340 to infer high quality prospects. For example, purchase volume can be correlated to any of PageRank, incoming TotalSpend, revenue, among other measures of transaction activity. Indeed, both PageRank and TotalSpend have similar enough Somers' D correlations to purchase volume to be used interchangeably.

Example 2—Node Selection Recommendations

In some embodiments, the dynamic link analysis engine 340 may employ the entity ranking module 342 and the dynamic query module 341 to analyze targeted entities to identify nodes sharing edges of particular characteristics with the targeted entities. For example, targeted entities may have behavior-related relationships with other entities that satisfy a user's desired characteristics. The desired behavior-related relationships can be identified using the dynamic link analysis engine 340, e.g., using a graph-based query, to identify other entities of interest.

For example, targeted business prospects (e.g., the prospects identified above in Example 1), may be analyzed to identify referral customers based on the prospects. For example, upon identifying the prospect, the dynamic query module 341 may highlight or otherwise identify graph edges linking nodes to the target prospect that have a high Spend value directed towards the prospect. The high spend value may be associated with a strength of a relationship between the node and the prospect. Thus, where a business relationship is already established with the entity associated with the node having the high Spend value, a user or relationship manager may use the entity as a referral to start a business relationship with the prospect. Because the dynamic relationship graph 231 includes edges connected each node, where the edges have attributes related to activities between each node, the dynamic relationship graph 231 provides a quick and efficient way to analyze the activity such that the user or relationship manager may easily and quickly identify referral opportunities. This user function is enabled by the underlying technology of the dynamic relationship graph 231 structure that leverages data from multiple sources and merges them into a single holistic quantification of relationships amongst nodes without duplicate entries.

Example 3—Behavior Pattern Analysis

In some embodiments, the dynamic link analysis engine 340 may leverage characteristics of edges in the dynamic relationship graph 231 to identify particular nodes that satisfy predetermined behavior patterns. For example, using, e.g., a graph-based query, nodes that exhibit behaviors-of-interest may be quickly identified by analyzing the edges connected to each node.

For example, an underwriting task may leverage the edges of each node to identify high risk edges for nodes that are subject to underwriting. For example, charged-off accounts may be quickly identified and the attributes of edges connecting a target node to the charged-off account nodes can be utilized to assess a level of risk associated with the target node. For example, based on a proportion of incoming Spend from the charged-off accounts relative to total incoming Spend, the risk associated with the target node may be identified.

In another example, the dynamic relationship graph 231 may be analyzed by the anomaly detection module 343 to identify edges of a target node that are high risk or potentially fraudulent. For example, edges that begin and end at the target node indicate self-swipe actions at the target node where the associated entity uses a credit account to pay itself. Such activities are highly indicative of risk, both for backbook and frontbook transactions In another example, the dynamic link analysis engine 340 may use the entity ranking module 342 and the dynamic query module 341 to analyze the dynamic entity relationship graph 231 and identify high-potential customers, such as, e.g., "Super Spender" businesses that have a high degree of revenue relative to other businesses for, e.g., potential product and service upgrades or promotions. For example, as described above, the entity ranking module 342 may remove outgoing spend and keep incoming spend. In some embodiments, to identify the Super Spenders, the entity ranking module 342 may remove outcoming Spend (e.g., money spent by a target entity) and analyze incoming Spend (e.g., money received by the target entity). PageRank may then be used to rank all businesses based on their respective incoming Spend and the top, e.g., $80^{th}$, $85^{th}$, $90^{th}$, $95^{th}$, etc., percentile of entities based on their incoming Spend, may be identified. The PageRank may be used as a way to rank high purchase volume companies. Each node having a high PageRank (although in-degree centrality may also be used), such as a PageRank in an $85^{th}$ percentile, may be modified to include a label attribute of "Super Spender" to quickly and efficiently flag entities as high-potential customers.

In some embodiments, the dynamic link analysis engine 340 may generate a model of customers. For example, the dynamic link analysis engine 340 may generate embeddings for the dynamic relationship graph 231 to convert nodes into vector form. The vectors may then be used to build a model based on the graph structure. The model may then be used to determine entity behaviors, including, e.g., high spending potential. In some embodiments, graph embeddings can be generated using any suitable graph embedding technique based on the dynamic relationship graph 231. For example, some embodiments may employ a Deepwalk technique. Using Deepwalk, the dynamic link analysis engine 340 may form sample paths by performing random walks on the graph. The random paths may be treated as sentences in a word2vec function to train a Skip-gram network. In the Skip-gram network, a one-hot vector representing a node form the random walks is used as an input (e.g., upon word2vec), and the Skip-gram network is trained to maximize the probability for predicting neighbor nodes. Once the Skip-gram network is trained, embeddings can be generated at the output of a hidden layer of the Skip-gram network. However, any other suitable technique for generating graph embeddings may be employed.

In some embodiments, upon generating the graph embeddings and the associated vector representation for each node, machine learning models may be employed using the node vectors, such as, e.g., supervised and/or unsupervised machine learning models. For examples, the dynamic relationship graph 231 may be used to train the machine learning models to use the node vectors as features to predict attributes or behaviors for each nodes (e.g., annual revenue, profitability, industry, charge-off behaviors, etc.). Upon forming such predictions, the node vectors may undergo dimension reduction for plotting the node vectors. The plotted node vectors may then be used to determine whether similar nodes are proximate to each other in the plot, to indicate similar behaviors.

FIG. 4 is an example diagram of a dynamic entity relationship graph formed by the entity graphing system in accordance with one or more embodiments of the present disclosure.

Figure 5:
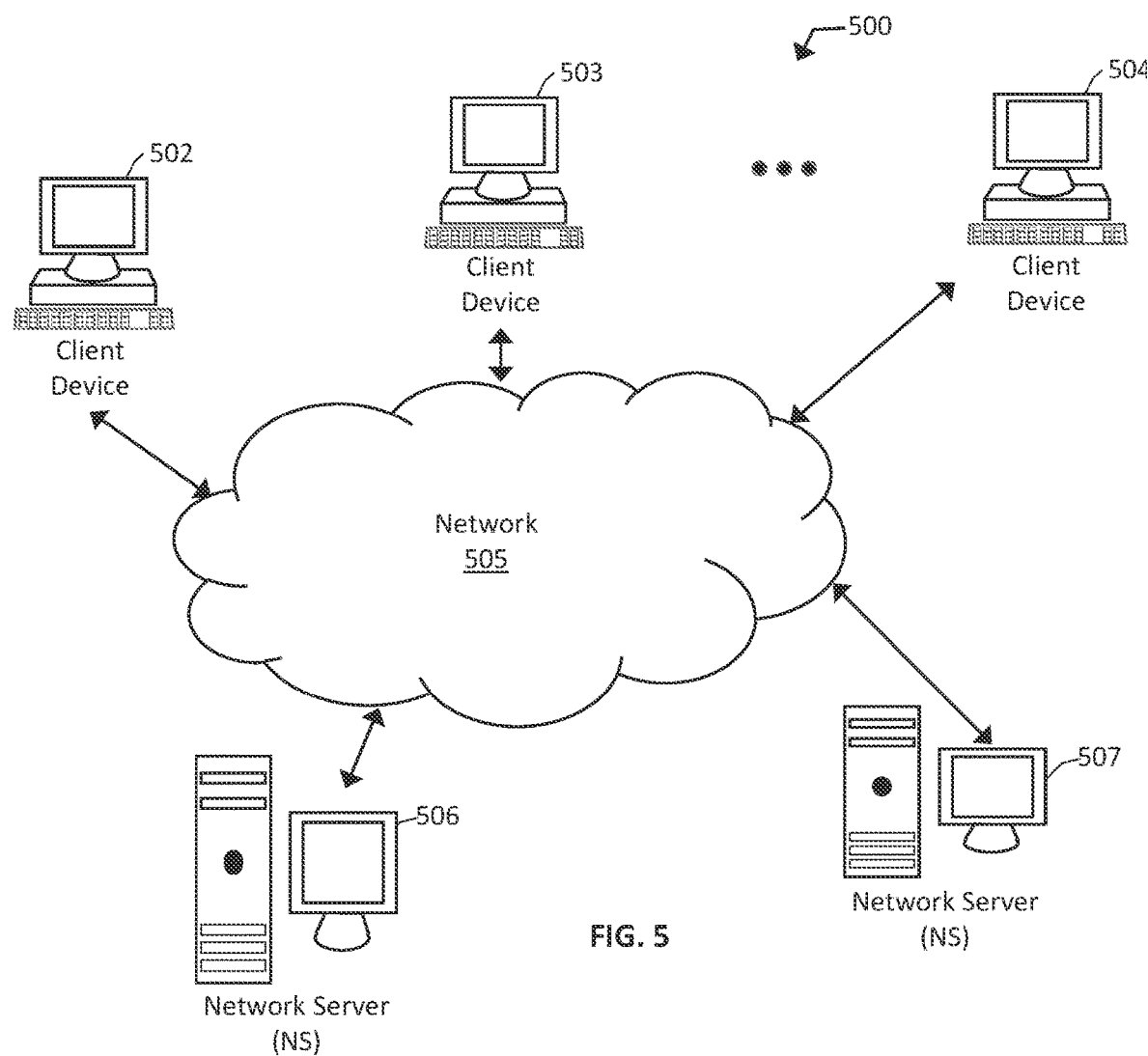

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, members 502-504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++ and/or other suitable programming language. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Microsoft Windows Server, Novell NetWare, or Linux. In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
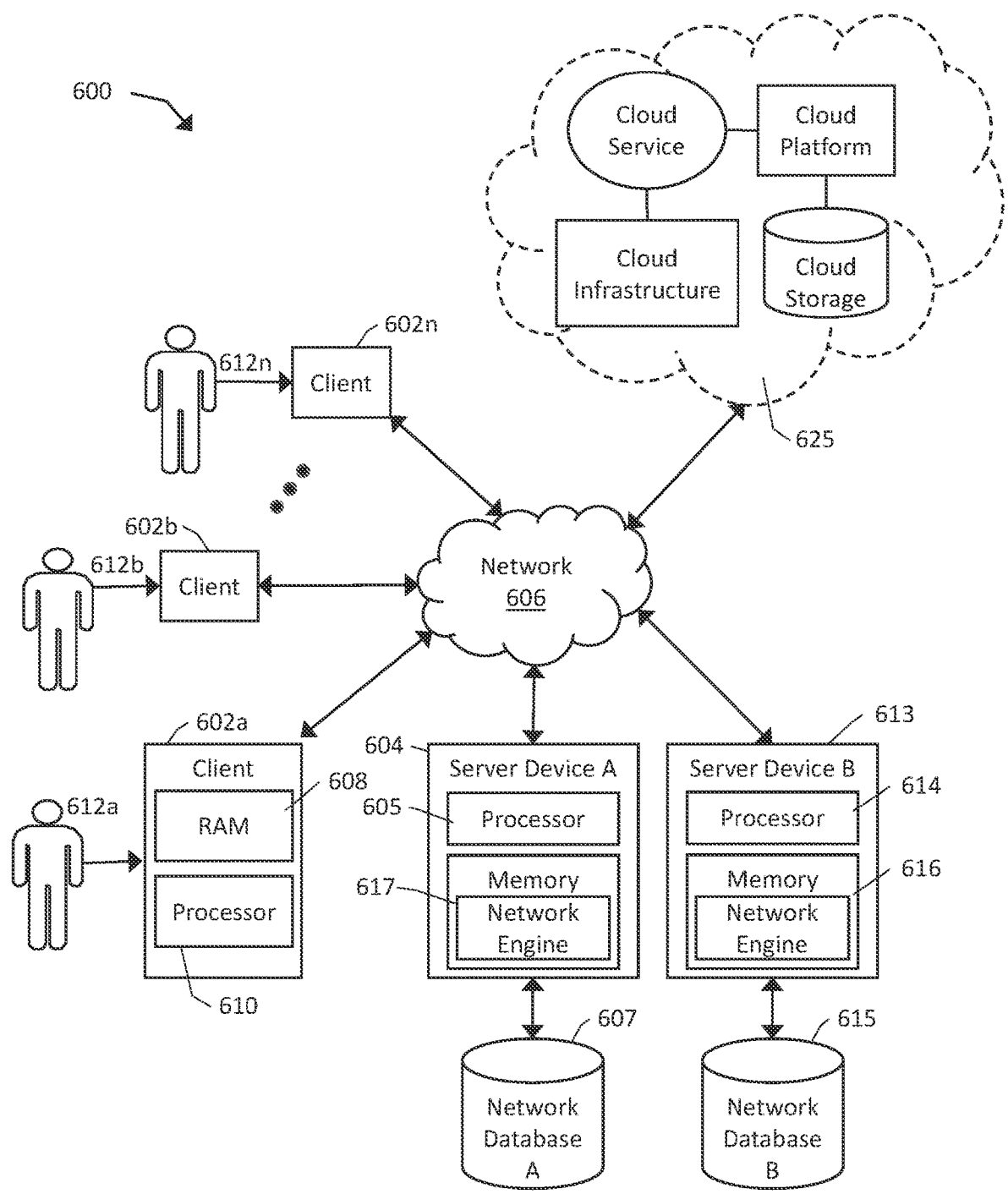

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 602a, 602b thru 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, users, 612a through 602n, may communicate over the exemplary network 606 with each other and/or with other systems and/or devices coupled to the network 606. As shown in FIG. 6, exemplary server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
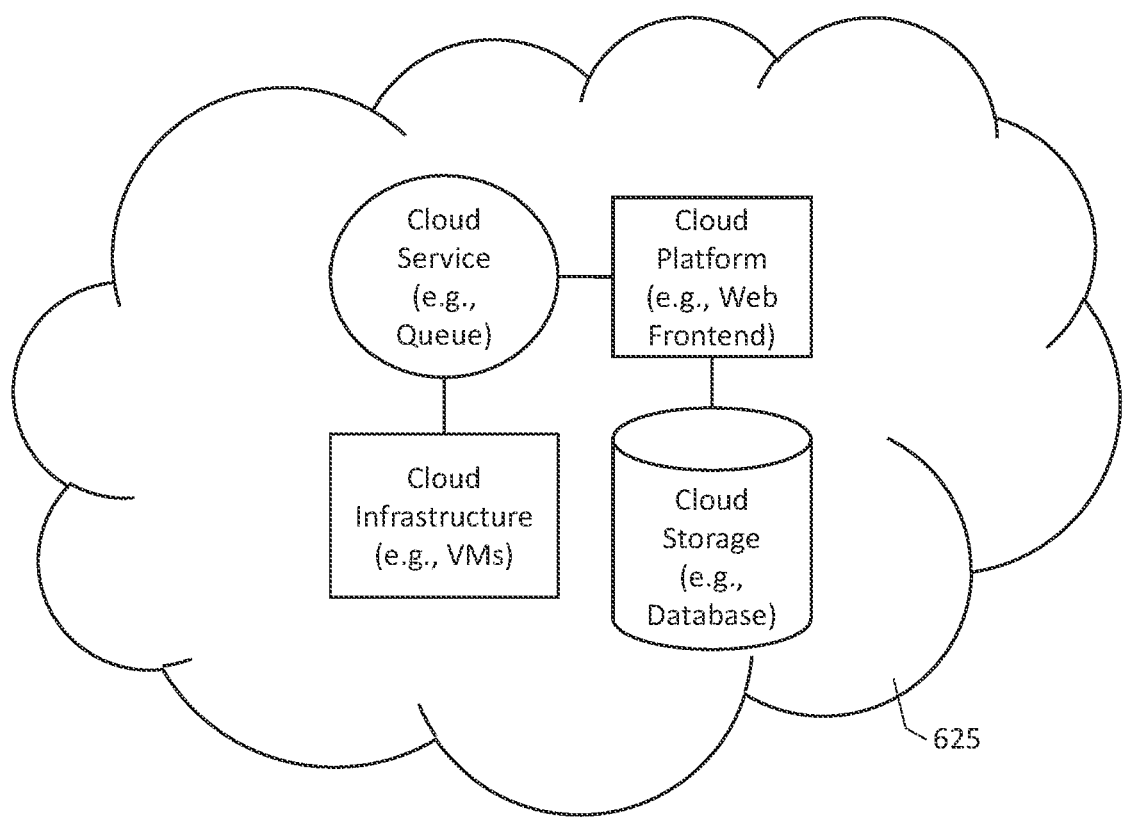
Figure 8:
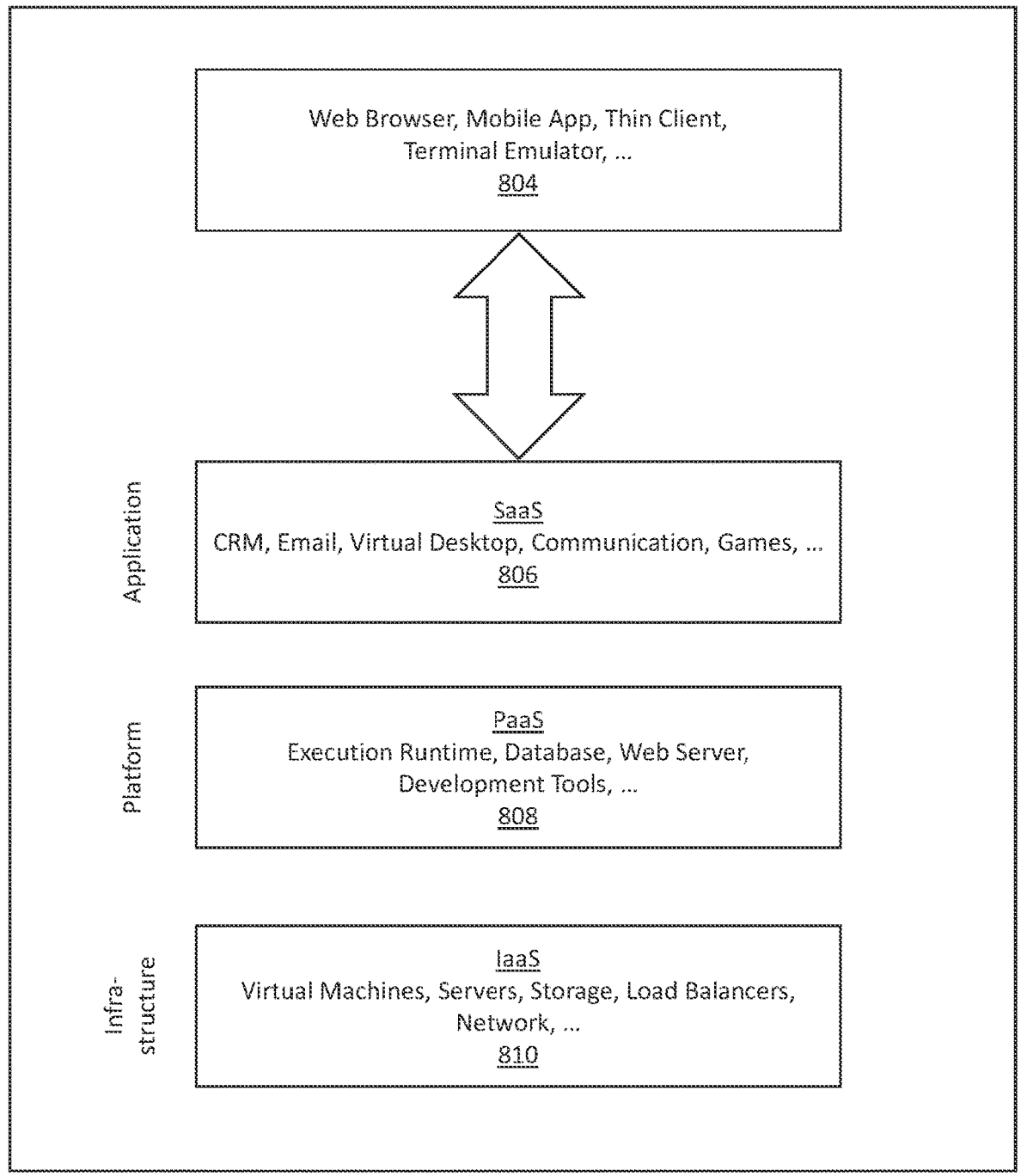

In some embodiments, the illustrative computer-based systems or platforms of the present disclosure may be specifically configured to operate in a cloud computing/architecture such as, but not limiting to: infrastructure a service (IaaS), platform as a service (PaaS), and/or software as a service (SaaS). FIGS. 7 and 8 illustrate schematics of exemplary implementations of the cloud computing/architecture(s) in which the illustrative computer-based systems or platforms of the present disclosure may be specifically configured to operate.

At least some aspects of the present disclosure will now be described with reference to the following numbered clauses.

1. A method including:
   receiving, by at least one processor, a plurality of entity-specific data records for a plurality of entities, wherein each entity-specific data record of the plurality of entity-specific data records is associated with a particular entity of the plurality of entities;
   receiving, by the at least one processor, a plurality of entity-related activity records for the plurality of entities, wherein each entity-specific activity record of the plurality of entity-related activity record comprises activity data regarding at least one activity associated with at least one entity;
   generating, by the at least one processor, a plurality of graph nodes for an entity activity graph based at least in part on the plurality of entity-specific data records;

wherein each graph node of the plurality of graph nodes represents the particular entity of the plurality of entities;

generating, by the at least one processor, an activity data structure, comprising:
  i) the plurality of graph nodes and
  ii) at least one respective dynamic edge directed from a respective first node to a respective second node of the plurality of graph nodes based at least in part on at least one respective activity represented in the plurality of entity-related activity records;
    wherein the at least one respective dynamic edge represents at least one respective dynamic characteristic of the at least one respective activity between the plurality of graph nodes based at least in part on a dynamic updating of at least one entity-related activity record;

determining, by the at least one processor, a set of entities having queried characteristics in response to a graph query of the activity data structure for the queried characteristics from at least one user computing device associated with at least one user; and causing to display, by the at least one processor, an indicated of the set of entities on a display of the at least one computing device.

2. The method as recited in clause 1, further comprising:
  receiving, by the at least one processor, a plurality of entity-specific datasets comprising a plurality of sets of entity-specific data records; and
  determining, by the at least one processor, the entity-specific data records by resolving entities across the plurality of sets of entity-specific data records.

3. The method as recited in clause 1, wherein the activity score comprises determining, by the at least one processor, the activity score for each edge of the at least one edge based at least in part on an aggregate quantity associated with activity between each respective entity of each respective graph node for each edge.

4. The method as recited in clause 1, wherein the activity comprises monetary transactions between two or more entities associated with the two or more graph nodes.

5. The method as recited in clause 4, further comprising receiving, by the at least one processor, the monetary transactions from business-to-business payments.

6. The method as recited in clause 1, further comprising updating, by the at least one processor, the at least one edge according to a predetermined period.

7. The method as recited in clause 6, wherein the predetermined period comprises one day.

8. The method as recited in clause 1, further comprising generating, by the at least one processor, an entity rank representing a list of the plurality of entities ranked according a ranking algorithm based on each activity score quantifying the activity between the two or more graph nodes of the entity activity graph.

9. The method as recited in clause 1, further comprising detecting, by the at least one processor, risk-related behaviors based at least in part on the at least one edge.

10. The method as recited in clause 9, further comprising generating, by the at least one processor, a high risk alert for entities associated with the two or more nodes of the at least one edge.

11. A method comprising:
  receiving, by at least one processor, a plurality of entity-specific data records for a plurality of entities, wherein each entity-specific data record of the plurality of entity-specific data records is associated with a particular entity of the plurality of entities;
  receiving, by the at least one processor, a plurality of entity-related activity records for the plurality of entities, wherein each entity-specific activity record of the plurality of entity-related activity record comprises activity data regarding at least one activity associated with at least one entity;
  generating, by the at least one processor, a plurality of graph nodes for an entity activity graph based at least in part on the plurality of entity-specific data records;
    wherein each graph node of the plurality of graph nodes represents the particular entity of the plurality of entities;
  generating, by the at least one processor, an activity data structure, comprising:
    i) the plurality of graph nodes and
    ii) at least one respective dynamic edge directed from a respective first node to a respective second node of the plurality of graph nodes based at least in part on at least one respective activity represented in the plurality of entity-related activity records;
      wherein the at least one respective dynamic edge represents at least one respective dynamic characteristic of the at least one respective activity between the plurality of graph nodes based at least in part on a dynamic updating of at least one entity-related activity record;
  generating, by the at least one processor, an entity rank representing a list of the plurality of entities ranked according a ranking algorithm based on each activity score quantifying the activity between the two or more graph nodes of the entity activity graph; and
  causing to display, by the at least one processor, the entity rank on a display of at least one computing device associated with at least one user.

12. The method as recited in clause 11, further comprising:
  receiving, by the at least one processor, a plurality of entity-specific datasets comprising a plurality of sets of entity-specific data records; and
  determining, by the at least one processor, the entity-specific data records by resolving entities across the plurality of sets of entity-specific data records.

13. The method as recited in clause 11, wherein the activity score comprises determining, by the at least one processor, the activity score for each edge of the at least one edge based at least in part on an aggregate quantity associated with activity between each respective entity of each respective graph node for each edge.

14. The method as recited in clause 11, wherein the activity comprises monetary transactions between two or more entities associated with the two or more graph nodes.

15. The method as recited in clause 14, further comprising receiving, by the at least one processor, the monetary transactions from business-to-business payments.

16. The method as recited in clause 11, further comprising updating, by the at least one processor, the at least one edge according to a predetermined period.

17. The method as recited in clause 16, wherein the predetermined period comprises one day.

18. The method as recited in clause 11, further comprising detecting, by the at least one processor, risk-related behaviors based at least in part on the at least one edge.

19. The method as recited in clause 18, further comprising generating, by the at least one processor, a high risk alert for entities associated with the two or more nodes of the at least one edge.

20. A system comprising:
- at least one processor configured to access instructions stored in a non-transitory computer readable medium that cause the at least one processor to perform steps to:
  - receive a plurality of entity-specific data records for a plurality of entities, wherein each entity-specific data record of the plurality of entity-specific data records is associated with a particular entity of the plurality of entities;
  - receive a plurality of entity-related activity records for the plurality of entities, wherein each entity-specific activity record of the plurality of entity-related activity record comprises activity data regarding at least one activity associated with at least one entity;
  - generate a plurality of graph nodes for an entity activity graph based at least in part on the plurality of entity-specific data records;
    - wherein each graph node of the plurality of graph nodes represents the particular entity of the plurality of entities;
  - generate an activity data structure, comprising:
    - i) the plurality of graph nodes and
    - ii) at least one respective dynamic edge directed from a respective first node to a respective second node of the plurality of graph nodes based at least in part on at least one respective activity represented in the plurality of entity-related activity records;
      - wherein the at least one respective dynamic edge represents at least one respective dynamic characteristic of the at least one respective activity between the plurality of graph nodes based at least in part on a dynamic updating of at least one entity-related activity record; and
  - determine a set of entities having queried characteristics in response to a graph query of the activity data structure for the queried characteristics from at least one user computing device associated with at least one user;
    - cause to display an indicated of the set of entities on a display of the at least one computing device.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
  receiving, by at least one processor, a plurality of entity-related activity records for a plurality of entities, wherein each entity related activity record of the plurality of entity-related activity record comprises activity data regarding at least one activity associated with at least one entity of the plurality of entities;
    wherein the activity data comprises at least one quantity associated with the at least one activity;
  determining, by the at least one processor, at least one unknown entity associated with the plurality of entity-related activity records based at least in part on the activity data of at least one entity-related activity record being associated with at least one entity that is different from each entity of the plurality of entities;
  generating, by the at least one processor, an activity data structure, comprising:
    generating at least one graph node in an entity activity graph based at least in part on the plurality of entity related activity records;
      wherein the at least one graph node represents the at least one unknown entity;
    generating a plurality of dynamic edges between the at least one graph node and at least one additional graph node associated with the at least one entity based at least in part on the plurality of entity-related activity records;
    wherein each respective dynamic edge represents at least one respective dynamic characteristic of at least one respective activity based at least in part on a dynamic updating of at least one respective entity-related activity record;
merging, by the at least one processor, the plurality of dynamic edges into at least one merged dynamic edge between the at least one entity and the at least one unknown entity;
determining, by the at least one processor, an aggregate quantity associated with the at least one merged dynamic edge based at least in part on an aggregation of each respective quantity of the at least one respective activity associated with the at least one respective dynamic edge of the at least one respective merged dynamic edge;
determining, by the at least one processor, activity quantity characteristics associated with the at least one unknown entity based at least in part on the aggregate quantity associated with at least one respective merged dynamic edge associated with at least one respective graph node of at least one unknown entity in response to a graph query of the activity data structure for queried activity quantity characteristics from at least one user computing device associated with at least one user; and
generating, by the at least one processor, at least one entity specific data record associated with the at least one unknown entity to store the activity quantity characteristics of the at least one unknown entity.

2. The method as recited in claim 1, further comprising:
receiving, by the at least one processor, a plurality of sets of entity-specific data records; and
determining, by the at least one processor, the entity-specific data records by resolving entities across the plurality of sets of entity-specific data records.

3. The method as recited in claim 1, further comprising determining, by the at least one processor, an activity score for each merged dynamic edge of the plurality of merged dynamic edges based at least in part on an aggregate quantity associated with activity between each respective entity of each respective graph node for each merged dynamic edge.

4. The method as recited in claim 1, wherein the activity comprises monetary transactions between two or more entities associated with two or more graph nodes.

5. The method as recited in claim 4, further comprising receiving, by the at least one processor, the monetary transactions from business-to-business payments.

6. The method as recited in claim 1, further comprising updating, by the at least one processor, the plurality of merged dynamic edges according to a predetermined period.

7. The method as recited in claim 6, wherein the predetermined period comprises one day.

8. The method as recited in claim 1, further comprising generating, by the at least one processor, an entity rank representing a list of the plurality of entities ranked according a ranking algorithm based on each aggregate quantity quantifying the activity between two or more graph nodes of the entity activity graph.

9. The method as recited in claim 1, further comprising detecting, by the at least one processor, risk-related behaviors based at least in part on the plurality of merged dynamic edges.

10. The method as recited in claim 9, further comprising generating, by the at least one processor, a high risk alert for entities associated with two or more nodes of the at least one dynamic edge.

11. A system comprising:
at least one processor in communication with at least one non-transitory computer readable medium having software stored thereon, wherein, upon execution of the software instructions, the at least one processor is configured to:
    receive a plurality of entity-related activity records for a plurality of entities, wherein each entity related activity record of the plurality of entity-related activity record comprises activity data regarding at least one activity associated with at least one entity of the plurality of entities;
        wherein the activity data comprises at least one quantity associated with the at least one activity;
    determine at least one unknown entity associated with the plurality of entity-related activity records based at least in part on the activity data of at least one entity-related activity record being associated with at least one entity that is different from each entity of the plurality of entities;
    generate an activity data structure, comprising:
        generating at least one graph node in an entity activity graph based at least in part on the plurality of entity related activity records;
            wherein the at least one graph node represents the at least one unknown entity;
        generating a plurality of dynamic edges between the at least one graph node and at least one additional graph node associated with the at least one entity based at least in part on the plurality of entity-related activity records;
            wherein each respective dynamic edge represents at least one respective dynamic characteristic of at least one respective activity based at least in part on a dynamic updating of at least one respective entity-related activity record;
    merge the plurality of dynamic edges into at least one merged dynamic edge between the at least one entity and the at least one unknown entity;
    determine an aggregate quantity associated with the at least one merged dynamic edge based at least in part on an aggregation of each respective quantity of the at least one respective activity associated with the at least one respective dynamic edge of the at least one respective merged dynamic edge;
    determine activity quantity characteristics associated with the at least one unknown entity based at least in part on the aggregate quantity associated with at least one respective merged dynamic edge associated with at least one respective graph node of at least one unknown entity in response to a graph query of the activity data structure for queried activity quantity characteristics from at least one user computing device associated with at least one user; and
    generate at least one entity specific data record associated with the at least one unknown entity to store the activity quantity characteristics of the at least one unknown entity.

12. The system as recited in claim 11, wherein, upon execution of the software instructions, the at least one processor is further configured to:
    receive a plurality of sets of entity-specific data records; and determine the entity-specific data records by resolving entities across the plurality of sets of entity-specific data records.

13. The system as recited in claim 11, wherein, upon execution of the software instructions, the at least one processor is further configured to determine an activity score for each merged dynamic edge of the plurality of merged dynamic edges based at least in part on an aggregate quantity associated with activity between each respective entity of each respective graph node for each merged dynamic edge.

14. The system as recited in claim 11, wherein the activity comprises monetary transactions between two or more entities associated with two or more graph nodes.

15. The system as recited in claim 14, wherein, upon execution of the software instructions, the at least one processor is further configured to receive the monetary transactions from business-to-business payments.

16. The system as recited in claim 11, wherein, upon execution of the software instructions, the at least one processor is further configured to update the plurality of merged dynamic edges according to a predetermined period.

17. The system as recited in claim 16, wherein the predetermined period comprises one day.

18. The system as recited in claim 11, wherein, upon execution of the software instructions, the at least one processor is further configured to generate an entity rank representing a list of the plurality of entities ranked according a ranking algorithm based on each aggregate quantity quantifying the activity between two or more graph nodes of the entity activity graph.

19. The system as recited in claim 11, wherein, upon execution of the software instructions, the at least one processor is further configured to detect risk-related behaviors based at least in part on the plurality of merged dynamic edges.

20. The system as recited in claim 19, wherein, upon execution of the software instructions, the at least one processor is further configured to generate a high risk alert for entities associated with two or more nodes of the at least one dynamic edge.

* * * * *